United States Patent
Cheng et al.

(10) Patent No.: US 12,324,995 B1
(45) Date of Patent: Jun. 10, 2025

(54) MAGNETIC RESPONSE FIBER MATERIAL AND ITS PREPARATION METHOD AND APPLICATION

(71) Applicant: Tianjin University of Science and Technology, Tianjin (CN)

(72) Inventors: Bowen Cheng, Tianjin (CN); Dengkun Shu, Tianjin (CN); Shuo Yang, Tianjin (CN); Chenyang Li, Tianjin (CN); Peng Xi, Tianjin (CN); Lei Xia, Tianjin (CN)

(73) Assignee: Tianjin University of Science and Technology, Tianjin (CN)

( * ) Notice: Subject to any disclaimer, the term of this patent is extended or adjusted under 35 U.S.C. 154(b) by 0 days.

(21) Appl. No.: 19/001,573

(22) Filed: Dec. 26, 2024

(30) Foreign Application Priority Data

Dec. 28, 2023 (CN) .......................... 202311825489.1

(51) Int. Cl.

| | | |
|---|---|---|
| *B01D 17/02* | (2006.01) | |
| *B01D 39/16* | (2006.01) | |
| *B01D 39/20* | (2006.01) | |
| *C02F 1/28* | (2023.01) | |
| *C02F 1/40* | (2023.01) | |
| *D01D 1/02* | (2006.01) | |
| *D01D 5/00* | (2006.01) | |
| *D01F 1/10* | (2006.01) | |
| *D01F 6/04* | (2006.01) | |
| *D04H 1/728* | (2012.01) | |
| *C02F 101/32* | (2006.01) | |
| *C02F 103/00* | (2006.01) | |

(52) U.S. Cl.
CPC .......... *B01D 17/0202* (2013.01); *C02F 1/285* (2013.01); *C02F 1/40* (2013.01); *D01D 1/02* (2013.01); *D01D 5/0038* (2013.01); *D01F 1/10* (2013.01); *D01F 6/04* (2013.01); *D04H 1/728* (2013.01); *B01D 39/1623* (2013.01); *B01D 39/2031* (2013.01); *C02F 2101/32* (2013.01); *C02F 2103/007* (2013.01); *D10B 2321/021* (2013.01); *D10B 2401/00* (2013.01); *D10B 2505/00* (2013.01)

(58) Field of Classification Search
CPC ............ B01D 17/0202; B01D 39/1623; B01D 39/2031; C02F 1/285; C02F 1/40; C02F 2101/32; C02F 2103/007; D01D 1/02; D01D 5/0038; D01D 5/11; D01F 1/10; D01F 6/04; D04H 1/728; D10B 2321/021; D10B 2401/00; D10B 2505/00
See application file for complete search history.

(56) References Cited

U.S. PATENT DOCUMENTS

| | | | | |
|---|---|---|---|---|
| 9,023,534 | B2 * | 5/2015 | Nakamori | ................ D04H 1/42 |
| | | | | 429/247 |
| 2002/0100725 | A1 * | 8/2002 | Lee | ...................... D04H 1/4242 |
| | | | | 264/413 |

FOREIGN PATENT DOCUMENTS

| | | | | | |
|---|---|---|---|---|---|
| CN | 104436760 | A | * | 3/2015 | ............. B01D 17/02 |
| CN | 105442069 | A | * | 3/2016 | ............. D01D 13/02 |

OTHER PUBLICATIONS

Shu et. al. Flash spinning polyethylene/Fe3O4 magnetic drive fibers for oil absorption underwater. Chemical Engineering Journal 490 (2024) 151333. (Year: 2004).*

Xia Lei et al., " Research progress of flash spinning nano/microfiber nonwoven technology", Journal of Textile Research, Aug. 2020, pp. 166-171, vol. 41, No. 8.

* cited by examiner

*Primary Examiner* — Liam Royce

(57) ABSTRACT

A magnetic response fiber material and a preparation method and an application thereof are provided, which relates to the field of oil-water separation materials. The preparation method includes: mixing a fiber-forming polymer, a primary solvent, a secondary solvent and magnetic nanoparticles to form a uniform spinning solution, where the fiber-forming polymer includes at least one of polyethylene, polypropylene and polymethylpentene; spinning the spinning solution by a spinning process to obtain the magnetic response fiber material. The prepared magnetic response fiber material has the advantages of high oil absorption speed, high oil absorption capacity and high separation efficiency. Magnetic nanoparticles have a high load, which can not only be driven by magnetic force to absorb oil floating on water surface, but also be driven to an underwater oil pollution position to absorb oil, and can be applied to water purification in oil-polluted areas that cannot be reached by manual processing.

4 Claims, 5 Drawing Sheets

MAGNETIC RESPONSE FIBER MATERIAL AND ITS PREPARATION METHOD AND APPLICATION

CROSS-REFERENCE TO RELATED APPLICATION

This application claims priority to Chinese Patent Application No. 202311825489.1, filed Dec. 28, 2023, which is herein incorporated by reference in its entirety.

TECHNICAL FIELD

The disclosure relates to the technical field of oil-water separation materials, and more particularly to a magnetic response fiber material, and a preparation method and an application thereof.

BACKGROUND

In real life, all kinds of oil substances are used in all walks of life, but in the process of transportation, storage and use, leakage will occur from time to time, which will cause serious damage to the natural ecological environment and pollute the water body. Oil on the surface of the water body will reduce oxygen infiltration, resulting in anoxia in the water body and affecting the living environment of aquatic organisms. In addition, some hydrocarbon substances with teratogenicity and carcinogenicity in oils naturally decompose slowly and are easy to accumulate in the aquatic organisms, and ultimately affect human health through natural circulation. Therefore, a low-cost, fast and efficient oil-water separation material is needed to effectively deal with oil leakage accidents.

Among the current oil removal methods, physical adsorption has attracted much attention because of its fast adsorption speed, recyclability, environmental friendliness, no secondary pollution and low potential safety hazards. In the physical adsorption method, fiber adsorption materials can separate oil and water quickly and efficiently because of their stable chemical properties, excellent mechanical properties, high porosity, large specific surface area and good recycling performance. For example, the Chinese patent document CN112442752A discloses that a mixture of polypropylene, diluent and nucleating agent is subjected to spinning, air spinning, cooling treatment and extraction treatment to finally obtain a polypropylene fiber with high mechanical properties and high separation efficiency. For another example, the Chinese patent document CN112221478A discloses that the graphene oil-absorbing fiber with efficient oil-water separation performance is prepared by loading poly(butyl methacrylate) and reductive graphene oxide on the fiber.

The preparation process of the fiber adsorption materials provided by the above scheme is complicated, some raw materials are expensive, the yield of the materials prepared at one time is limited, and the application field is narrow, which has certain limitations on the removal of oil stains in extreme environments, such as oil substances in special-shaped pipelines, which cannot be well played by manpower.

With the expansion of application fields and the improvement of requirements for adsorption materials, the demand for new materials for intelligent and responsive oil-water separation is increasing. Oil-water separation materials with magnetic response performance show great potential to solve the oil pollution under the above special circumstances. For example, the Chinese patent document CN104436760A discloses an oil-water separation fiber membrane with high magnetic response. The fiber membrane mainly uses hydrophobic polymers such as polyvinylidene fluoride, polyurethane or polycaprolactone as main raw materials, which are dissolved in an organic solvent to form a polymer solution. A non-woven fiber membrane material composed of micro-nano structured fibers is prepared by electrostatic spinning. After that, by polymerizing dopamine in an alkaline solution to form a viscous polydopamine membrane, magnetic nanoparticles are firmly adhered to the surface of the electrospun fiber membrane, and the high-efficiency oil-water separation fiber membrane with magnetic response is prepared.

However, the above scheme has the following disadvantages. The electrostatic spinning method is inefficient and the industrialization process is slow, which is not suitable for large-scale preparation. The mechanical strength of fiber membrane is relatively low, and it is easy to be destroyed during operation, which affects the recycling rate. Magnetic nanoparticles adhere to the surface of electrospun fiber membrane, which is relatively poor in firmness and easy to fall off, resulting in limited driving ability and cannot play a good role in the face of underwater oil pollution.

Therefore, it is of great significance to provide a fiber adsorption material with magnetic response, which is suitable for industrial preparation, good mechanical properties, high oil absorption speed, high oil absorption, high separation efficiency and high recycling rate.

SUMMARY

Therefore, the technical problem to be solved by the disclosure aims to overcome the defects that the magnetic response fiber material in the related art is not suitable for large-scale preparation, the driving ability is limited, and the mechanical properties are low, so as to provide a new magnetic response fiber material, a preparation method and an application thereof.

To achieve the above objectives, the disclosure provides the following technical solutions.

In a first aspect, the disclosure provides a preparation method of a magnetic response fiber material, which includes the following steps:

step (1), mixing a fiber-forming polymer, a primary solvent, a secondary solvent and magnetic nanoparticles to form a uniform spinning solution, where the fiber-forming polymer includes at least one of polyethylene, polypropylene and polymethylpentene; and step (2) spinning the spinning solution by a high-pressure electrospray spinning process to obtain the magnetic response fiber material.

In an embodiment, a mass ratio of the fiber-forming polymer to the magnetic nanoparticles is in a range of (9-10):(1-10).

In an embodiment, a mass-volume ratio of the fiber-forming polymer to the primary solvent is in a range of (1-2):(6-7) in terms of grams per milliliter (g/mL).

In an embodiment, a mass ratio of the fiber-forming polymer to the secondary solvent is in a range of (1-2):(7-8).

In an embodiment, the mass ratio of the fiber-forming polymer to the magnetic nanoparticles is 9:(1-9). The mass-volume ratio of the fiber-forming polymer to the primary solvent is 1:(6-7) in terms of g/mL. The mass ratio of the fiber-forming polymer to the secondary solvent is 1:(7-8), and the secondary solvent is carbon dioxide.

In an embodiment, the primary solvent includes at least one of aliphatic hydrocarbon and halogenated hydrocarbon. The aliphatic hydrocarbon includes at least one of n-hexane and butane. The halogenated hydrocarbon includes at least one of dichloromethane and chloroform.

In an embodiment, the secondary solvent includes at least one of alkane, cycloalkane, nitrogen and carbon dioxide.

In an embodiment, the magnetic nanoparticles include at least one of iron oxide ($Fe_3O_4$) nanoparticles and nickel oxide nanoparticles. A diameter of the magnetic nanoparticles is in a range of 50-80 nanometers (nm).

In an embodiment, a temperature of the mixing in step (1) is in a range of 200-250° C., specifically, 200° C.

In an embodiment, conditions of the high-pressure electrospray spinning process are: temperature of 200-250° C., pressure of 10-15 megapascals (MPa), and stirring speed of 150-200 revolutions per minute (r/min).

In an embodiment, the conditions of the high-pressure electrospray spinning process specifically are: temperature is the temperature of 230° C., the pressure of 10-15 MPa, and the stirring speed of 150-180 r/min.

In a second aspect, the disclosure provides the magnetic response fiber material obtained by the preparation method.

In the third aspect, the disclosure provides the application of the magnetic response fiber material obtained by the preparation method in oil-water separation.

In an embodiment, the magnetic response fiber material is used for underwater oil-water separation.

In the fourth aspect, the disclosure provides an oil-water separation method, which uses the magnetic response fiber material obtained by the preparation method to absorb oil, and uses magnetic materials to drive the magnetic response fiber material to move during the oil absorption.

In the preparation method of the magnetic response fiber material provided by the disclosure, the fiber-forming polymer, the primary solvent, the secondary solvent and the magnetic nanoparticles are mixed to form the uniform spinning solution, and the spinning solution is spun by adopting a high-pressure electrospray spinning process to obtain the magnetic response fiber material.

Polyethylene, polypropylene and polymethylpentene with good mechanical property, hydrophobic property and regular structure are selected as the fiber-forming polymer, which can adapt to the high-pressure electrospray spinning process and can be well formed into fibers. Insoluble polymers such as polyethylene and polypropylene are treated by solution electrostatic spinning process. Melt electrospinning can directly melt high-viscosity polymers without solvent, but the yield is low, and ultra-fine continuous long fibers with cross-linked network structure cannot be prepared. Other polymers, such as polyvinylidene fluoride and polyester, cannot be spun into fibers due to their melt or solution strength being unsuitable for the high-pressure electrospray spinning process.

The primary solvent should not react with the fiber-forming polymer, and can dissolve the fiber-forming polymer at high temperature and high pressure, and can evaporate instantaneously at low temperature and low pressure, such as aliphatic hydrocarbons (n-hexane, butane, etc.) and halogenated hydrocarbons (dichloromethane, chloroform, etc.), etc. Specifically, one or more formed mixed solvents can be selected as the primary solvent.

The main function of the secondary solvent is to promote dissolution. For example, the secondary solvent is alkane, cycloalkane, and some gases (such as nitrogen and carbon dioxide).

Magnetic nanoparticles endow materials with magnetic response properties, such as using magnetic oxides such as iron oxides and nickel oxides.

The process of preparing fiber by high-pressure electrospray spinning is roughly as follows: the fiber-forming polymer forms spinning fluid under high temperature and high pressure, and is released under normal pressure. Due to the sudden drop of pressure, the solvent and supercritical fluid expand rapidly at the spinneret, and the polymer jet is stretched at high speed, which leads to rapid phase separation during high-speed movement, and after curing, ultra-fine continuous long fiber with cross-linked network structure is formed.

It should be noted that the conventional solution electrostatic spinning method for preparing fiber materials by mixing and spinning suitable fiber-forming polymers and magnetic nanoparticles has the following disadvantages as follows. The fiber cannot be shaped with too much magnetic nanoparticles, and the fiber cannot meet the requirement of oil absorption driven by underwater magnetic force with too little magnetic nanoparticles. The mechanical properties of the fiber prepared by solution electrospinning are low. If the magnetic fiber is prepared by mixing the magnetic nanoparticles, the mechanical properties would be further reduced.

In this disclosure, the fiber-forming polymers with good mechanical properties are used as spinning raw materials, and the fiber-forming polymers and the magnetic nanoparticles are interwoven into a fiber material with a cross-linked network structure by a high-pressure electrospray spinning process, so that the magnetic nanoparticles can be firmly bonded on the fiber network. Specifically, the fiber-forming polymer has excellent comprehensive properties such as lipophilic and hydrophobic, non-toxic, easy to process, good chemical stability and low price. Magnetic nanoparticles can endow the fiber with magnetic response performance. The fiber prepared by high-pressure electrospray spinning method has high strength, small fiber diameter and high specific surface area, and the fibers are entangled with each other to form a cross-linked three-dimensional network structure. These properties of the fiber are conducive to rapid and efficient oil removal. The fiber prepared by high-pressure electrospray spinning method can still form fiber even when the mass percentage of magnetic nanoparticles is up to 50%, and its mechanical properties are good, which is difficult to realize by the solution electrostatic spinning method in the face of high load of magnetic nanoparticles.

Because the fiber-forming polymer has good mechanical properties, the fiber material has good mechanical strength, is not easy to be damaged, and improves the recycling rate. The fiber-forming polymer has good hydrophobicity, high oil absorption and good oil absorption performance. Because the magnetic nanoparticles are firmly combined, they are not easy to fall off, and have high magnetic response ability and strong driving ability.

The technical solutions of the disclosure have the advantages as follows.
1. The magnetic response fiber material prepared by the disclosure has the advantages of small fiber diameter, large specific surface area, high strength and good mechanical properties, which is interconnected in the three-dimensional direction to form an intricate fiber network. This structure makes the fiber have high oil absorption speed, high oil absorption capacity and high separation efficiency, and has good adsorption effect on vacuum pump oil, tetrachloromethane, dichloromethane, toluene, n-hexane and other oils.

2. In the magnetic response fiber material prepared by the disclosure, the magnetic nanoparticles have high load, are not easy to scatter, and are evenly distributed in the fiber, so that the fiber has a rapid magnetic response, and can also show high sensitivity in an oil-water mixing system. It can not only absorb oil floating on water surface driven by magnetic force, but also be driven to an underwater oil pollution position for oil absorption, and can be applied to water purification in oil-polluted areas that cannot be reached by manual processing.
3. After being used, the magnetic response fiber material prepared by the disclosure can separate out the adsorbed oil by physical methods such as extrusion and centrifugation, and the material has high recycling rate, and still has high adsorption capacity after repeated oil absorption and desorption for 10 times.
4. The high-pressure electrospray spinning process adopted by the disclosure is a technology for preparing micro-nano fibers at ultra-high speed and in a large scale, which has high production speed, can be prepared in a large scale and can realize large-scale production.

BRIEF DESCRIPTION OF DRAWINGS

In order to describe specific embodiments of the disclosure or the technical scheme in the related art more clearly, the attached drawings needed in the description of the specific embodiments or the related art will be briefly introduced below. Apparently, the attached drawings in the following description are some embodiments of the disclosure. For those skilled in related art, other drawings can be obtained based on the attached drawings without creative effort.

DESCRIPTION OF REFERENCE SIGNS

1—autoclave, 2—autoclave heating jacket, 3—spinneret, 4—high-voltage electric valve, 5—drive motor, 6—agitator, 7—pressure relief hole, and 8—pressure relief valve.

DETAILED DESCRIPTION OF EMBODIMENTS

The following embodiments are provided for a better understanding of the disclosure, and are not limited to the illustrated embodiments, nor do they limit the content and protection scope of the disclosure. Any product that is the same as or similar to the disclosure obtained by anyone under the inspiration of the disclosure or by combining the disclosure with other features of the related art falls within the protection scope of the disclosure.

The high-pressure electrospray spinning process described in this disclosure is carried out by high-pressure electrospray spinning equipment, and the specific equipment is not limited, and the existing high-pressure electrospray spinning equipment can be selected. The high-pressure electrospray spinning equipment in the embodiments of the disclosure has been disclosed in the Chinese patent document CN105442069A.

Figure 1:
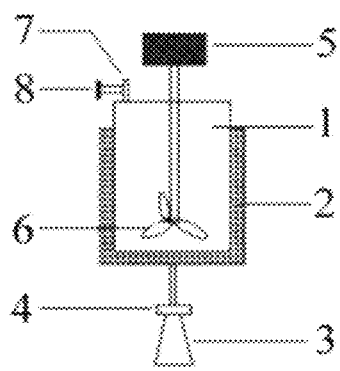
FIG. 1 illustrates a schematic structural diagram of high-pressure electrospray spinning equipment used in preparing magnetic response fiber materials in embodiments 1 to 5 of the disclosure.

As shown in FIG. 1, the high-pressure electrospray spinning equipment includes an autoclave 1, a heating jacket 2, a spinneret 3, a high-voltage electric valve 4, a driving motor 5, an agitator 6, a pressure relief hole 7, and a pressure relief valve 8. The heating jacket 2 is wrapped outside the autoclave 1 to provide heating for the autoclave 1. A lid of the autoclave 1 is provided with the pressure relief hole 7, which is controlled by the pressure relief valve 8. The drive motor 5 drives the agitator 6 to stir the materials in the autoclave 1. The lower surface of the autoclave 1 is directly connected to the spinneret 3 through the high-voltage electric valve 4.

If the specific experimental steps or conditions are not specified in the embodiments, the operation or conditions of the conventional experimental steps described in the literature in the field can be carried out. The raw materials or instruments used are all conventional products available in the market, including but not limited to the raw materials or instruments used in the embodiments of the disclosure.

Embodiment 1

This embodiment provides a magnetic response fiber material, which is prepared according to the following steps.
(1) 66 grams (g) of polyethylene, 7.3 g of magnetic $Fe_3O_4$ nanoparticles with a diameter of 80 nm, and 450 mL of dichloromethane are prepared and placed into the autoclave of the high-pressure electrospray spinning equipment, 0.5 kilograms (kg) of carbon dioxide gas is introduced, then stirred at a speed of 180 r/min, and heated up to 200° C., so that polyethylene can be fully dissolved in dichloromethane to form a uniform spinning solution.
(2) The spinning solution is spun at the temperature of 230° C. and the pressure of 10 MPa to obtain the magnetic response fiber material.

The magnetic response fiber material prepared in this embodiment has a crisscrossed distribution with a rough surface, uniformly loaded with magnetic $Fe_3O_4$ nanoparticles, and an average fiber diameter of 12 micrometers (μm).

In air, a contact angle of a water droplet (3 μL) on the surface of the magnetic response fiber material prepared in this embodiment 125°. In air, a contact angle of an oil droplet (3 μL) on the surface of the magnetic response fiber material prepared in this embodiment is 0°.

Embodiment 2

This embodiment provides a magnetic response fiber material, and its preparation steps are similar to that of the embodiment 1, except that the dosage of magnetic $Fe_3O_4$ nanoparticles in the step (1) is 16.5 g, and the spinning pressure in the step (2) is 11 MPa.

The magnetic response fiber material prepared in this embodiment has a crisscrossed distribution with a rough surface, uniformly loaded with magnetic $Fe_3O_4$ nanoparticles, and an average fiber diameter of 11 μm.

In air, the contact angle of the water droplet (3 μL) on the surface of the magnetic response fiber material prepared in this embodiment 128°. In air, the contact angle of the oil droplet (3 μL) on the surface of the magnetic response fiber material prepared in this embodiment is 0°.

Embodiment 3

This embodiment provides a magnetic response fiber material, and its preparation steps are similar to that of the embodiment 1, except that the dosage of magnetic $Fe_3O_4$ nanoparticles in the step (1) is 28.3 g, and the spinning pressure in the step (2) is 12 MPa.

The magnetic response fiber material prepared in this embodiment has a crisscrossed distribution with a rough surface, uniformly loaded with magnetic $Fe_3O_4$ nanoparticles, and an average fiber diameter of 9 μm.

In air, the contact angle of the water droplet (3 μL) on the surface of the magnetic response fiber material prepared in this embodiment 135°. In air, the contact angle of the oil droplet (3 μL) on the surface of the magnetic response fiber material prepared in this embodiment is 0°.

Embodiment 4

This embodiment provides a magnetic response fiber material, and its preparation steps are similar to that of the embodiment 1, except that the dosage of magnetic $Fe_3O_4$ nanoparticles in the step (1) is 44 g, and the spinning pressure in the step (2) is 13 MPa.

The magnetic response fiber material prepared in this embodiment has a crisscrossed distribution with a rough surface, uniformly loaded with magnetic $Fe_3O_4$ nanoparticles, and an average fiber diameter of 8 μm.

In air, the contact angle of the water droplet (3 μL) on the surface of the magnetic response fiber material prepared in this embodiment is 139°. In air, the contact angle of the oil droplet (3 μL) on the surface of the magnetic response fiber material prepared in this embodiment is 0°.

Embodiment 5

This embodiment provides a magnetic response fiber material, and its preparation steps are similar to that of the embodiment 1, except that the dosage of magnetic $Fe_3O_4$ nanoparticles in the step (1) is 66 g, and the spinning pressure in the step (2) is 14 MPa.

Figure 2:
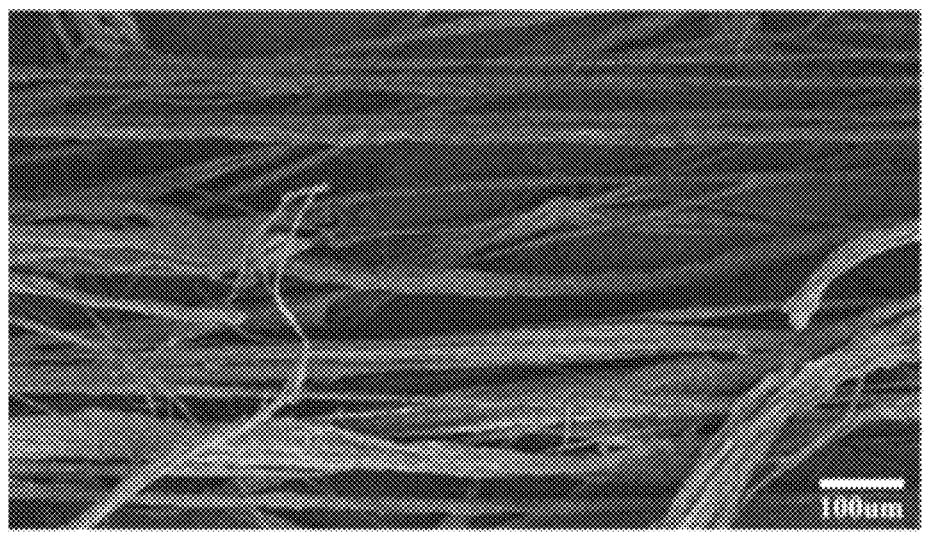
FIG. 2 illustrates a scanning electron micrograph of morphology of the magnetic response fiber material prepared in the embodiment 5 of the disclosure, magnified by 150 times.
Figure 3:
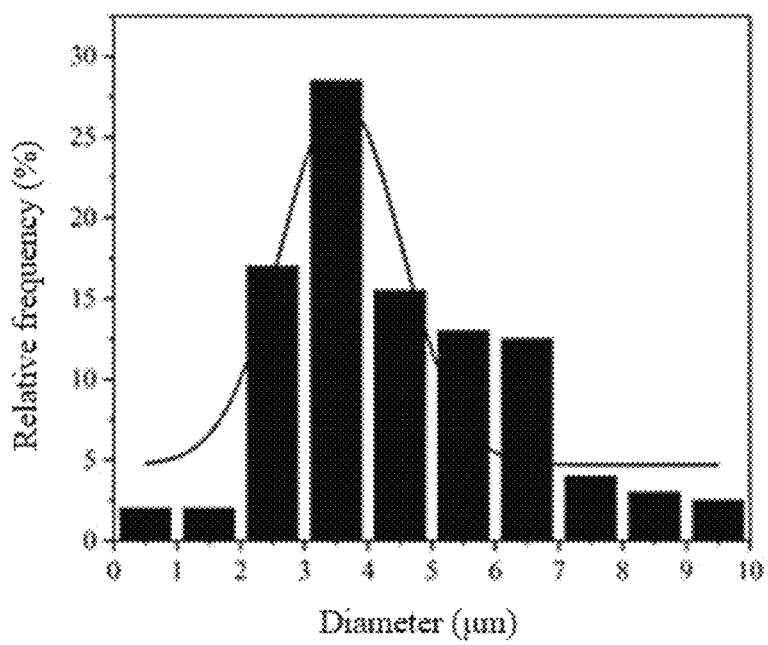
FIG. 3 illustrates a diagram showing a fiber diameter and distribution of the magnetic response fiber material prepared in the embodiment 5 of the disclosure.

As shown in FIG. 2, the scanning electron microscope of the magnetic response fiber material prepared in this embodiment shows that the fiber has a crisscrossed distribution with a rough surface, and is uniformly loaded with magnetic $Fe_3O_4$ nanoparticles. As shown in FIG. 3, an average diameter of the fiber is 4.5 μm.

Figure 4:
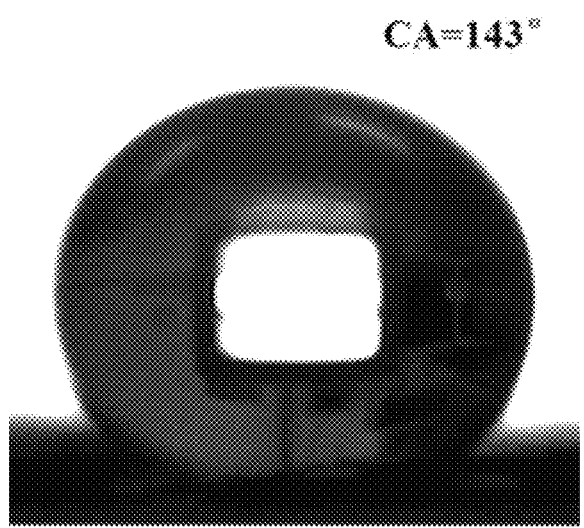
FIG. 4 illustrates a photograph showing a contact angle of a water droplet (3 microliters abbreviated as µL) in air on a surface of the magnetic response fiber material prepared in the embodiment 5 of the disclosure.
Figure 5:
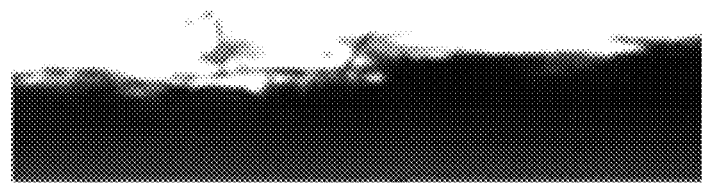
FIG. 5 illustrates a photograph showing a contact angle of an oil droplet (3 µL) in air on the surface of the magnetic response fiber material prepared in the embodiment 5 of the disclosure.

As shown in FIG. 4, in air, the contact angle of the water droplet (3 μL) on the surface of the magnetic response fiber material prepared in this embodiment is 143°. As shown in FIG. 5, in air, the contact angle of the oil droplet (3 μL) on the surface of the magnetic response fiber material prepared in this embodiment is 0°.

Experimental Embodiment

This experimental embodiment aims to verify the oil absorption effect of the magnetic response fiber materials prepared in embodiments 1-5.

1. Absorption Effect of Magnetic Response Fiber Materials on Different Oils.

Oil (vacuum pump oil, tetrachloromethane, dichloromethane, toluene and n-hexane) into a closed glassware, a certain amount of fiber is taken, the fiber is put in the oil for 1 minute, then the fiber is taken out, and the absorption ratio M (g/g) is calculated according to the following formula:

$$M = \frac{M_1 - M_2 - M_3}{M_3} \times 100. \quad (1)$$

In the formula, $M_1$ (g) is the mass of oil in a glass bottle before oil absorption; $M_2$ (g) is the mass of oil in the glass bottle after oil absorption; and $M_3$ (g) is the mass of the fiber.

Table 1 Absorption rate (g/g) of the magnetic response fiber materials prepared in the embodiments 1 to 5 for different oils.

| Sample | Vacuum pump oil | Tetrachloro-methane | Dichloro-methane | Toluene | N-hexane |
|---|---|---|---|---|---|
| Embodiment 1 | 71.1 | 70.2 | 60.4 | 50.3 | 42.5 |
| Embodiment 2 | 73.4 | 71.1 | 61.3 | 51.6 | 43.1 |
| Embodiment 3 | 74.6 | 72.7 | 62.5 | 52.1 | 40.4 |
| Embodiment 4 | 75.1 | 71.6 | 63.5 | 53.1 | 43.1 |
| Embodiment 5 | 76.2 | 73.1 | 64.5 | 53.2 | 44.1 |

Figure 6:
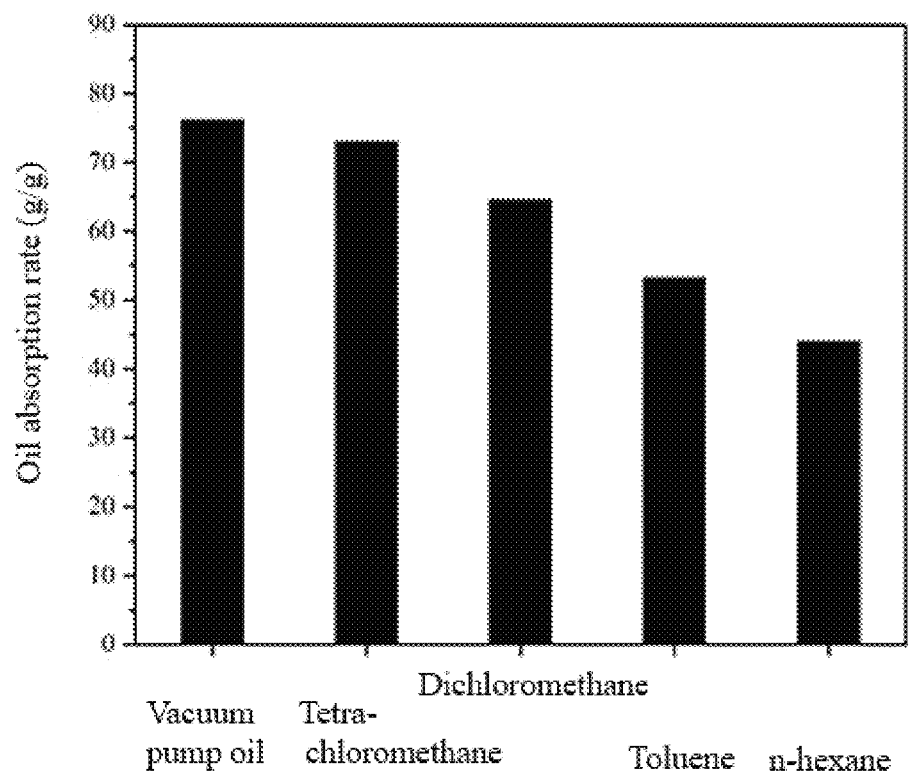
FIG. 6 illustrates a diagram showing an absorption rate of the magnetic response fiber material prepared in the embodiment 5 of the disclosure for various oils.

As shown in Table 1 and FIG. 6, the magnetic response fiber materials prepared in the embodiments 1-5 have high absorption rate for different oils (vacuum pump oil, tetrachloromethane, dichloromethane, toluene, and n-hexane), among which the absorption rate for the vacuum pump oil in the embodiment 5 is the highest, reaching 76.2 g/g.

2. Cyclic Performance of the Magnetic Response Fiber Materials

A certain amount of fiber is immersed in vacuum pump oil, taken out with tweezers and weighed. After washing with dichloromethane to remove the residual oil, the next oil adsorption is carried out, the sample is subjected to 10 adsorption-desorption cycles, and the absorption rate of each time is determined to study the recycling performance of the magnetic response fiber materials. The absorption rate is calculated according to the formula (1).

Table 2 Repeated absorption rate (g/g) of vacuum pump oil by magnetic response fiber materials prepared in the embodiments 1 to 5

|  | Cycle number | | | | | | | | | |
| --- | --- | --- | --- | --- | --- | --- | --- | --- | --- | --- |
| Sample | 1 | 2 | 3 | 4 | 5 | 6 | 7 | 8 | 9 | 10 |
| Embodiment 1 | 70.9 | 70.6 | 70.2 | 69.8 | 69.5 | 69.1 | 68.6 | 68.3 | 68.1 | 67.6 |
| Embodiment 2 | 73.3 | 73.1 | 72.7 | 72.2 | 71.9 | 71.5 | 71.2 | 70.9 | 70.5 | 69.8 |
| Embodiment 3 | 74.7 | 74.5 | 74.1 | 73.6 | 73.3 | 72.9 | 72.6 | 72.3 | 71.6 | 71.1 |
| Embodiment 4 | 75.1 | 74.9 | 74.6 | 74.1 | 73.7 | 73.3 | 72.9 | 72.5 | 71.9 | 71.4 |
| Embodiment 5 | 76.2 | 76.1 | 75.8 | 75.3 | 74.9 | 74.6 | 74.3 | 73.9 | 73.6 | 73.1 |

Figure 7:
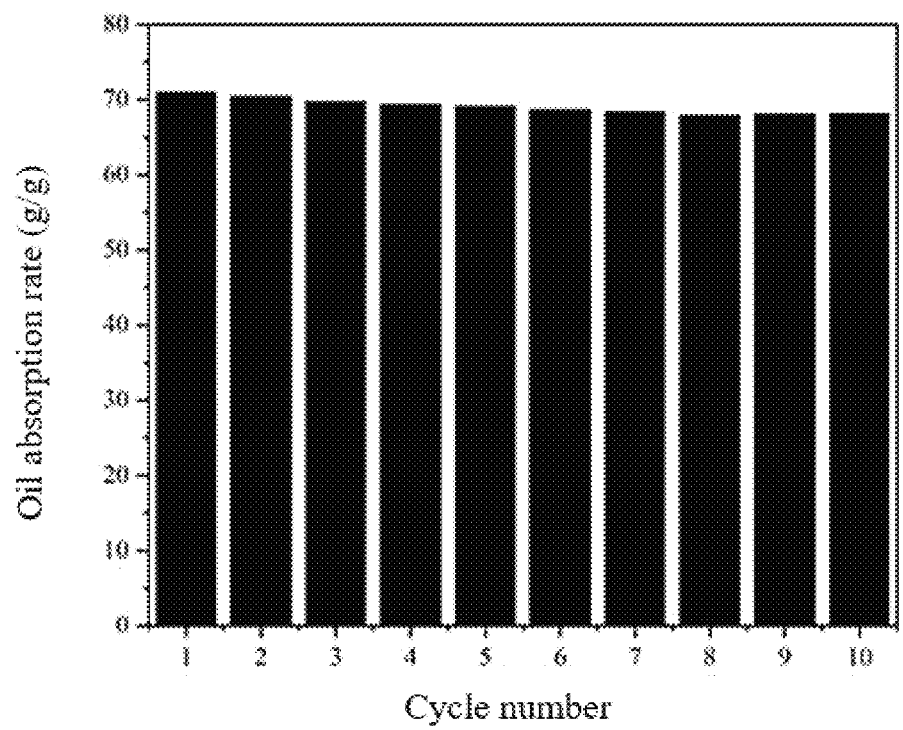
FIG. 7 illustrates a diagram showing a cyclic absorption rate of vacuum pump oil by the magnetic response fiber material prepared in the embodiment 5 of the disclosure.

As shown in Table 2 and FIG. 7, the oil absorption rate of the magnetic response fiber materials prepared in the embodiments 1 to 5 is not significantly reduced after being recycled for 10 times, and the $10^{th}$ oil absorption of the embodiment 5 is 96% of the first oil absorption, indicating that the fiber material still has a high oil-water separation capacity after 10 times of repeated oil absorption-desorption.

3. Underwater Oil Absorption Effect of Magnetic Response Fiber Materials 40 mL of water and 40 mL of oil (tetrachloromethane and dichloromethane) are placed in a glass bottle a, a certain amount of fiber is placed in the oil, and the fiber is taken out after 1 minute, and the taken-out fiber is placed in a closed glass bottle b. The liquid in the glass bottle b is poured into a separating funnel to separate the liquid, and the weight of water absorbed by the fiber is obtained. The underwater oil absorption is calculated according to the following formula:

$$M = \frac{M_1 - M_2 - M_3 - M_4}{M_2} \times 100. \tag{2}$$

In the formula, $M_1$ (g) is the mass of oil in glass bottle a before oil absorption; $M_2$ (g) is the mass of the fiber; $M_3$ (g) is the mass of oil in glass bottle a after oil absorption; $M_4$ (g) is the weight of water absorbed by the fiber.

Table 3 Underwater oil absorption rate (g/g) of the magnetic response fiber materials prepared in the embodiments 1 to 5.

| Samples | Tetrachloromethane | Dichloromethane |
| --- | --- | --- |
| Embodiment 1 | 62.1 | 48.2 |
| Embodiment 2 | 63.4 | 49.1 |
| Embodiment 3 | 64.9 | 50.5 |
| Embodiment 4 | 63.5 | 50.2 |
| Embodiment 5 | 65.3 | 52.7 |

Figure 8:
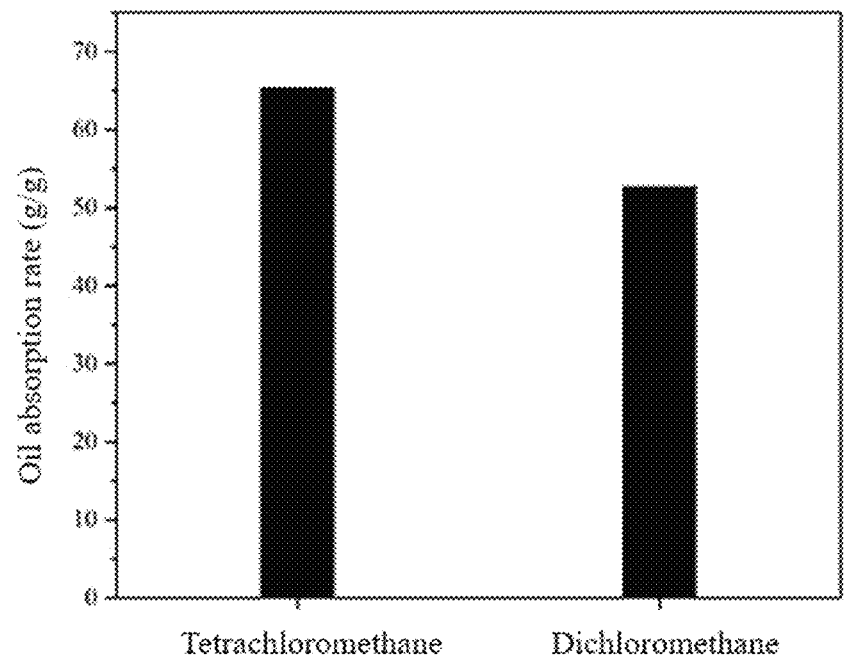
FIG. 8 illustrates a diagram showing an underwater absorption rate of tetrachloromethane and dichloromethane by the magnetic response fiber material prepared in the embodiment 5 of the disclosure.

As shown in Table 3 and FIG. 8, the magnetic response fiber materials prepared in the embodiments 1-5 still have high oil absorption for tetrachloromethane and dichloromethane under water.

4. Magnetic Driving Effect of Magnetic Response Fiber Materials

In order to characterize the oil adsorption effect of fiber magnetic drive, two kinds of special-shaped pipes are used, and vacuum pump oil and dichloromethane (Sudan III staining) are dripped at different positions of the pipes to simulate the underwater oil pollution, and then the fiber is driven to absorb oil under the guidance of magnetic force.

Figure 9:
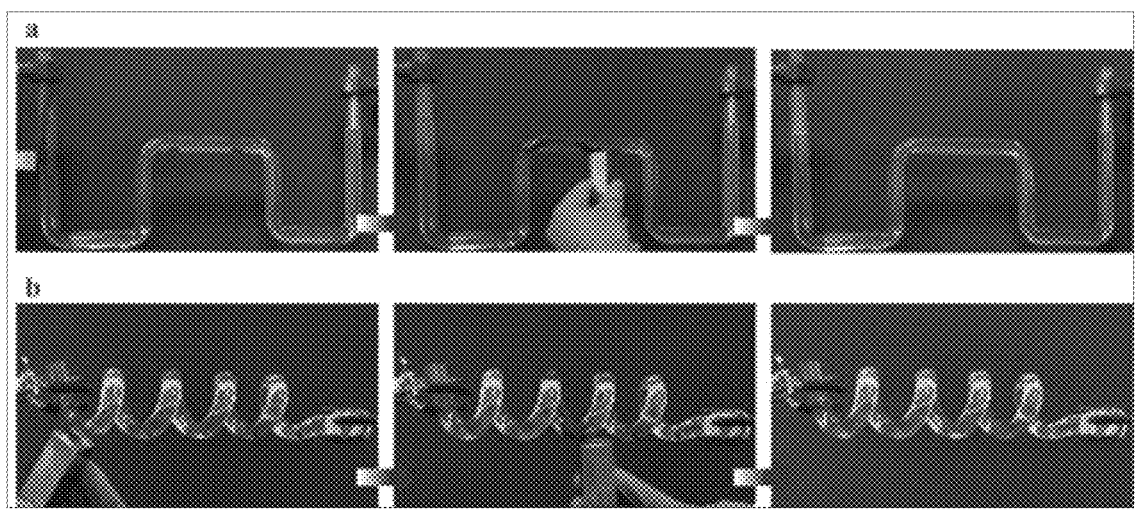
FIG. 9 illustrates a magnetic force driving display diagram of the magnetic response fiber material prepared in the embodiment 5 of the disclosure.

As shown in FIG. 9, the magnetic response fiber material prepared in the embodiment 5 has good magnetic response performance and good driving ability, and can move flexibly in various special-shaped pipes to efficiently complete the oil removal operation.

Apparently, the above embodiments are merely examples for clarity of illustration and are not limiting of the embodiments. For those skilled in the art, other changes or modifications in different forms can be made on the basis of the above description. An exhaustive list of all embodiments is not required and is not exhaustive. The obvious changes or modifications caused by this are still within the scope of protection created by the disclosure.

What is claimed is:

1. A preparation method of a magnetic response fiber material, comprising:
   step (1), mixing a fiber-forming polymer, a primary solvent, a secondary solvent and magnetic nanoparticles to form a uniform spinning solution, wherein the fiber-forming polymer comprises at least one of polyethylene, polypropylene and polymethylpentene; the primary solvent comprises at least one of aliphatic hydrocarbon and halogenated hydrocarbon; the aliphatic hydrocarbon comprises at least one of n-hexane and butane; the halogenated hydrocarbon comprises at least one of dichloromethane and chloroform; the secondary solvent comprises at least one of alkane, nitrogen and carbon dioxide; the magnetic nanoparticles comprise at least one of iron oxide nanoparticles and nickel oxide nanoparticles; a diameter of the magnetic nanoparticles is in a range of 50-80 nanometers (nm); a mass ratio of the fiber-forming polymer to the magnetic nanoparticles is in a range of (9-10):(1-10); a mass-volume ratio of the fiber-forming polymer to the primary solvent is in a range of (1-2):(6-7) in terms of grams per milliliter (g/mL); and a mass ratio of the fiber-forming polymer to the secondary solvent is (1-2):(7-8); and
   step (2), spinning the spinning solution by a high-pressure electrospray spinning process to obtain the magnetic response fiber material, wherein conditions of the high-pressure electrospray spinning process comprise: temperature of 200-250° C., pressure of 10-15 megapascals (MPa), and stirring speed of 150-200 revolutions per minute (r/min).

2. The preparation method as claimed in claim 1, wherein the mass ratio of the fiber-forming polymer to the magnetic nanoparticles is 9:(1-9);
   the mass-volume ratio of the fiber-forming polymer to the primary solvent is 1:(6-7) in terms of g/mL; and
   the mass ratio of the fiber-forming polymer to the secondary solvent is 1:(7-8), and the secondary solvent is the carbon dioxide.

3. The preparation method as claimed in claim 1, wherein a temperature of the mixing in step (1) is in a range of 200-250° C.

4. The preparation method as claimed in claim 3, wherein the temperature of the mixing in step (1) is 200° C.; and the conditions of the high-pressure electrospray spinning process are as follows: the temperature of 230° C., the pressure of 10-14 MPa, and the stirring speed of 150-200 r/min.

* * * * *